US011454582B2

United States Patent
Washizu et al.

(10) Patent No.: US 11,454,582 B2
(45) Date of Patent: Sep. 27, 2022

(54) SENSOR

(71) Applicant: Hochiki Corporation, Tokyo (JP)

(72) Inventors: Keisuke Washizu, Iwanuma (JP); Tomohiko Shimadzu, Natori (JP); Manabu Dohi, Shibata-gun (JP)

(73) Assignee: Hochiki Corporation, Tokyo (JP)

( * ) Notice: Subject to any disclaimer, the term of this patent is extended or adjusted under 35 U.S.C. 154(b) by 0 days.

(21) Appl. No.: 17/063,356

(22) Filed: Oct. 5, 2020

(65) Prior Publication Data
US 2021/0018420 A1 Jan. 21, 2021

Related U.S. Application Data

(63) Continuation-in-part of application No. PCT/JP2019/005666, filed on Feb. 15, 2019.

(30) Foreign Application Priority Data

Jun. 8, 2018 (JP) .............................. JP2018-109994
Jun. 11, 2018 (JP) .............................. JP2018-111000

(51) Int. Cl.
*G01N 15/06* (2006.01)
(52) U.S. Cl.
CPC ..... *G01N 15/06* (2013.01); *G01N 2015/0693* (2013.01)
(58) Field of Classification Search
None
See application file for complete search history.

(56) References Cited

U.S. PATENT DOCUMENTS 3,708,675 A * 1/1973 Tashiro ................ G08B 17/107
340/630
3,916,209 A * 10/1975 Steele .................. G08B 17/107
340/630
(Continued)

FOREIGN PATENT DOCUMENTS

JP S54-136983 9/1979
JP US56-09053 1/1981
(Continued)

OTHER PUBLICATIONS

International Search Report corresponding to International application No. PCT/JP2019/005666 dated Apr. 2, 2019.
(Continued)

*Primary Examiner* — Michael A Lyons
*Assistant Examiner* — Jarreas C Underwood
(74) *Attorney, Agent, or Firm* — Jenkins, Wilson, Taylor & Hunt, P.A.

(57) ABSTRACT

Provided is a detector 100 attached to an installation surface 900 of a ceiling, the detector 100 having an attachment surface 11 facing the installation surface 900, in which the detector 100 includes a light shielding space 3 into which smoke flows, a light emitting unit 61 and a light receiving unit 62 that detects smoke flowing into the light shielding space 3, an outer cover 2 that accommodates the light emitting unit 61, the light receiving unit 62, and the light shielding space 3, an outer cover-side inner side inflow/outflow opening 212 and an outer cover-side outer side inflow/outflow opening 213 that allow gas containing smoke to flow into and flow out of the light shielding space 3, the outer cover-side inner side inflow/outflow opening 212 and the outer cover-side outer side inflow/outflow opening 213 being provided toward an opposite side from the attachment surface 11 in the outer cover 2 with reference to a direction substantially orthogonal to the attachment surface 11, and a (Continued)

main body-side inclination portion 211 and a guide portion-side inclination portion 221 that guide gas so that gas flows into the light shielding space 3 through the outer cover-side inner side inflow/outflow opening 212 and the outer cover-side outer side inflow/outflow opening 213.

13 Claims, 3 Drawing Sheets

(56) References Cited

U.S. PATENT DOCUMENTS

| | | | | |
|---|---|---|---|---|
| 3,936,814 | A * | 2/1976 | Muller-Girard | G08B 17/107 340/508 |
| 4,121,110 | A * | 10/1978 | Solomon | G08B 17/113 340/630 |
| 4,220,862 | A * | 9/1980 | Byrne | H01J 47/02 250/385.1 |
| 5,670,947 | A * | 9/1997 | Nagashima | G08B 17/107 250/564 |
| 7,697,140 | B2 * | 4/2010 | Iguchi | G08B 17/107 340/630 |
| 9,196,141 | B1 * | 11/2015 | Schmidt | G08B 17/113 |
| 2003/0011770 | A1 * | 1/2003 | Cole | G08B 17/107 356/338 |
| 2004/0145483 | A1 * | 7/2004 | Pilkington | G08B 17/113 340/628 |
| 2010/0176957 | A1 * | 7/2010 | Iguchi | G08B 17/113 340/630 |
| 2015/0097679 | A1 * | 4/2015 | Andrews | G08B 17/113 340/628 |
| 2020/0319154 | A1 * | 10/2020 | Dohi | G01N 21/53 |
| 2021/0255101 | A1 * | 8/2021 | Shimadzu | G01N 21/53 |

FOREIGN PATENT DOCUMENTS

| | | |
|---|---|---|
| JP | H09-231482 | 9/1997 |
| JP | H10-049768 | 2/1998 |
| JP | 2005-134119 | 5/2005 |
| JP | 2011-248547 A | 12/2011 |
| JP | 2013-54455 A | 3/2013 |
| JP | 2016-099733 | 5/2016 |
| JP | 2018-010444 | 1/2018 |
| JP | 2018-067067 | 4/2018 |
| JP | 2018-81521 A | 5/2018 |
| WO | WO 2016/112085 A1 | 10/2006 |

OTHER PUBLICATIONS

Written Opinion corresponding to International application No. PCT/JP2019/005666 dated Apr. 2, 2019.
Written Opinion corresponding to International application No. PCT/JP2019/005666 dated Apr. 2, 2019 English translation.
Office Action corresponding to JP Application No. 2018-109994 dated May 24, 2022.
Partial English Translation of Office Action corresponding to JP Application No. 2018-109994 dated May 24, 2022.
Office Action corresponding to JP Application No. 2018-111000 dated May 24, 2022.
Partial English Translation of Office Action corresponding to JP Application No. 2018-111000 dated May 24, 2022.
Office Action corresponding to JP Application No. 2021-126361 dated Jul. 21, 2022.
Partial English Translation of Office Action corresponding to JP Application No. 2021-126361 dated Jul. 21, 2022.
Office Action corresponding to JP Application No. 2018-111000 dated Aug. 2, 2022.
Partial English Translation of Office Action corresponding to JP Application No. 2018-111000 dated Aug. 2, 2022.

* cited by examiner

[Fig. 1]
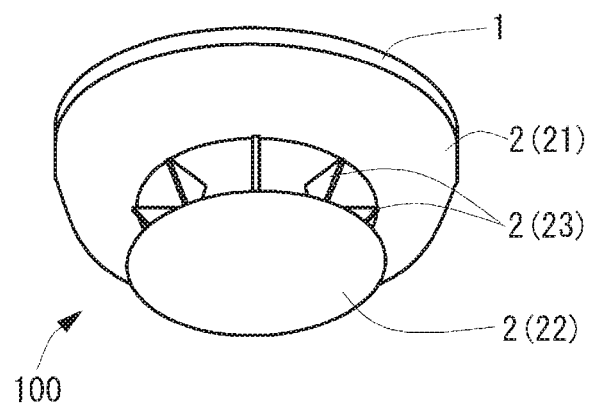
[Fig. 2]
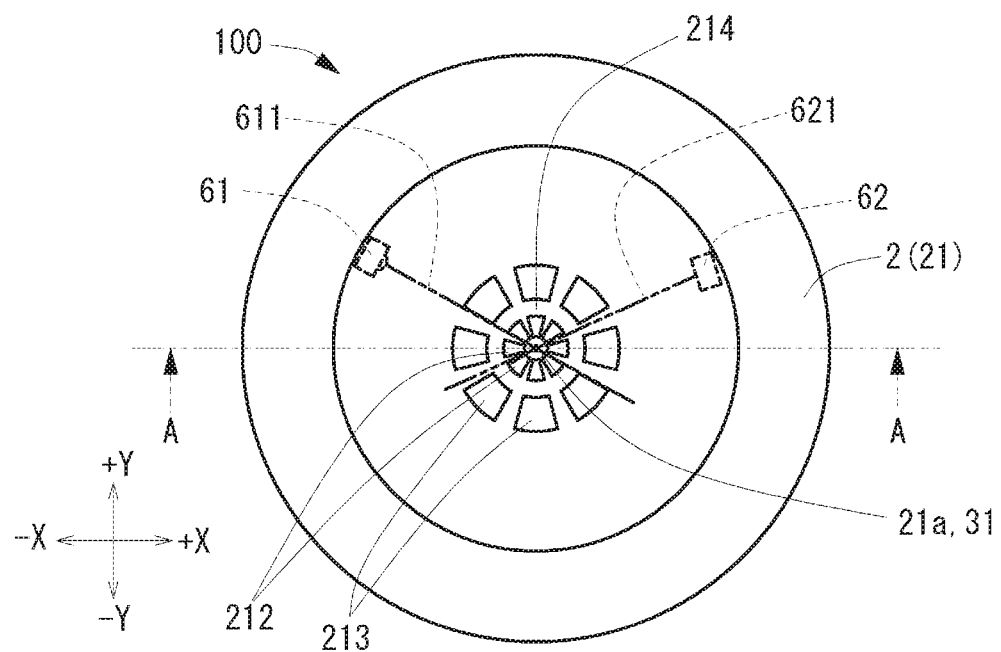

[Fig. 3]
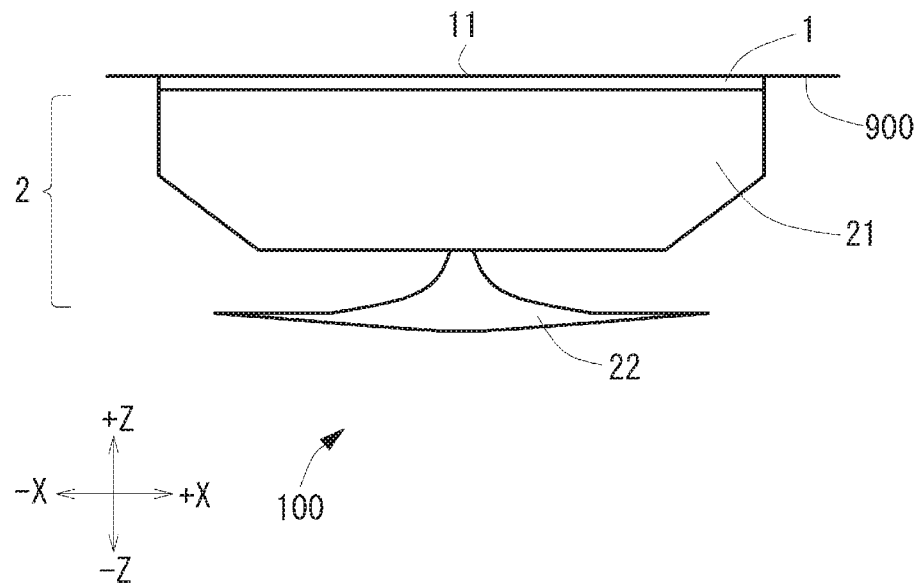
[Fig. 4]
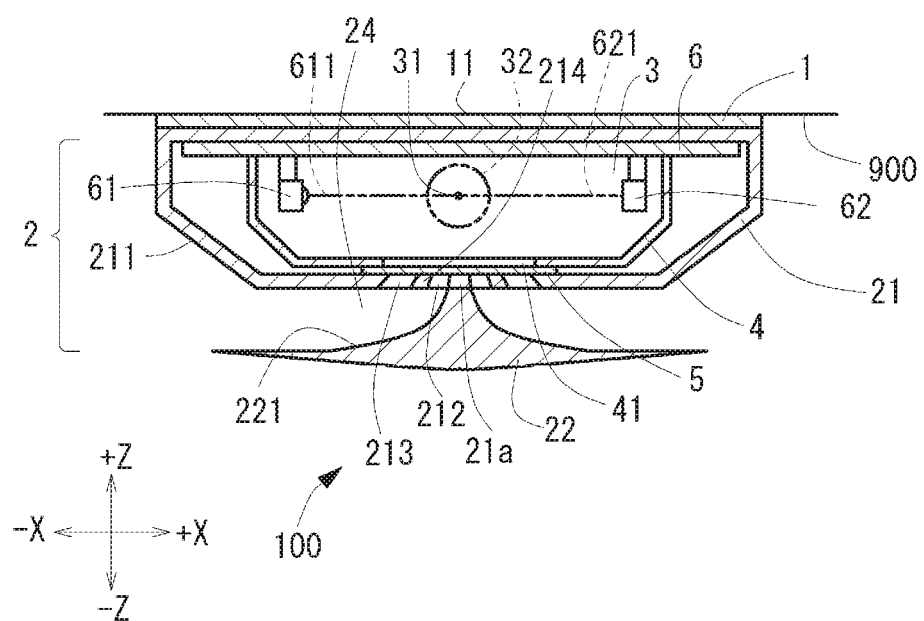

[Fig. 5]
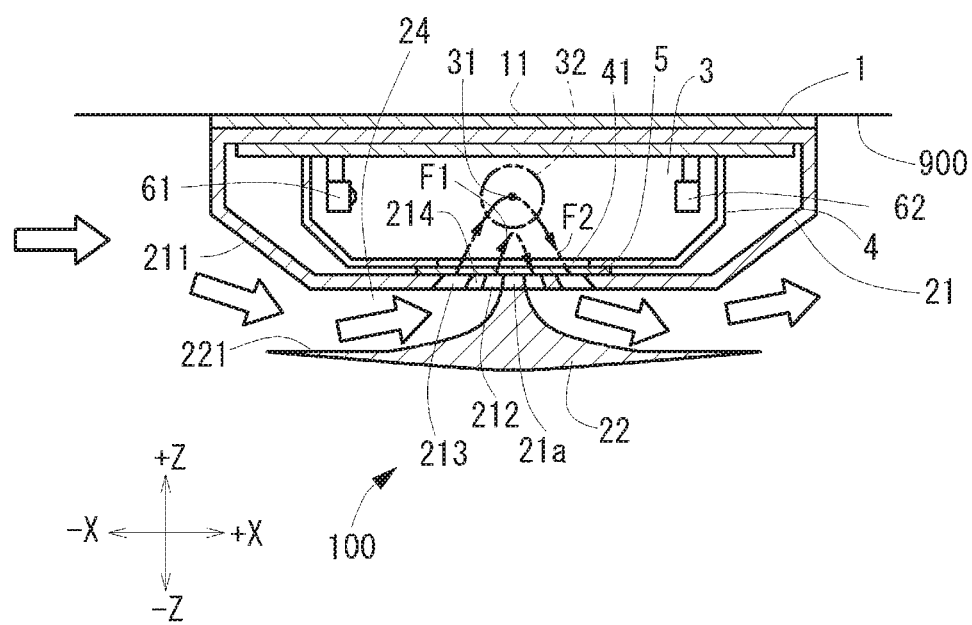

SENSOR

CROSS REFERENCE TO RELATED APPLICATIONS

The present application claims the benefit of Patent Application in Japan No. 2018-109994 filed on Jun. 8, 2018, the benefit of Patent Application in Japan No. 2018-111000 filed on Jun. 11, 2018 and the benefit of PCT application No. PCT/JP2019/005666 filed on Feb. 15, 2019, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a detector.

BACKGROUND ART

Conventionally, there has been a known fire detector including a smoke detection unit into which smoke flows and an outer cover that accommodates the smoke detection unit (for example, see Patent Document 1). The fire detector is installed, for example, on a ceiling, and allows gas to flow into and out of the smoke detection unit through a smoke opening provided in the outer cover to detect smoke in the gas flowing into the smoke detection unit, thereby determining a fire.

CITATION LIST

Patent Document
Patent Document 1: Laid-open Patent Application Publication in Japan No. 2011-248547

SUMMARY OF THE INVENTION

Technical Problem

However, in the conventional fire detector, since a labyrinth is provided in the smoke detection unit to shield an inside of the smoke detection unit from light, there is a possibility that an internal pressure of the smoke detection unit will become relatively high, and an inflow characteristic of gas from the smoke opening to the inside of the smoke detection unit will be degraded. For this reason, there is room for improvement from a viewpoint of reliably causing smoke to flow into the inside of the smoke detection unit by improving the inflow characteristic of the gas into the inside of the smoke detection unit.

It is an object of the present invention to solve the problems of the above mentioned prior arts.

Solution to Problem

One aspect of the present invention provides a detector comprises: a detection space into which a detection target flows; detection means that detects the detection target flowing into the detection space; and accommodating means that accommodates the detection means and the detection space.

BRIEF DESCRIPTION OF THE DRAWINGS

FIG. 1 is a perspective view of a detector according to the present embodiment.
FIG. 2 is an internal view seen from a bottom surface of the detector.
FIG. 3 is a side view of the detector.
FIG. 4 is a cross-sectional view taken along A-A line of FIG. 2.
FIG. 5 is a diagram illustrating an air flow in FIG. 4.

DESCRIPTION OF EMBODIMENTS

Hereinafter, an embodiment of a detector according to the invention will be described in detail based on drawings. The invention is not limited by this embodiment.

Basic Concept of Embodiment

First, a basic concept of the embodiment will be described. The embodiment generally relates to the detector.
Here, the "detector" is an apparatus that monitors a monitoring area, and specifically, monitors an abnormality in the monitoring area by detecting a detection target in the monitoring area. For example, the detector is attached to an installation surface of an installation object, and corresponds to, as an example, equipment that determines an abnormality such as a fire or a gas leak. For example, this "detector" is a concept including a smoke detector, a heat detector, a fire detector, a gas leak detector, etc.

The "monitoring area" is an area which is an object to be monitored by the detector, and specifically is a space having a certain extent, which is an indoor or outdoor space. For example, the monitoring area corresponds to a concept including a space such as a corridor, stairs, or a room of a building. In addition, the "installation object" is an object on which the detector is installed, and examples thereof include a ceiling, a wall, etc. In addition, the "installation surface" is a surface of the installation object on which the detector is installed, and examples thereof include a surface of the ceiling on the monitoring area side (that is, a lower surface of the ceiling), a surface of the wall on the monitoring area side (that is, an indoor side surface of the wall).

In addition, the "abnormality in the monitoring area" means that the monitoring area is in a state different from a normal state, and corresponds to a concept including, for example, an occurrence of a fire and an occurrence of a gas leak. In addition, the "detection target" is a target to be detected by the detector and specifically related to an abnormality in the monitoring area, and corresponds to a concept including, for example, smoke, heat, flame, and toxic gas such as carbon monoxide.

Further, in the embodiment below, a description will be given of a case in which the "detector" is the "fire detector", the "monitoring area" is the "room of the building", the "installation object" is the "ceiling", the "abnormality in the monitoring area" is the "occurrence of the fire", and the "detection target" is the "smoke".

(Configuration)

First, a description will be given of a configuration of the detector according to the present embodiment. FIG. 1 is a perspective view of the detector according to the present embodiment, FIG. 2 is an internal view seen from a bottom surface of the detector, FIG. 3 is a side view of the detector, and FIG. 4 is a cross-sectional view taken along A-A line of FIG. 2. For convenience of description, in FIG. 2, a guide portion 22 and a rib 23 of FIG. 1 are omitted, and at least an inside of a detector 100 in a state in which the detector 100 is viewed from a lower side (−Z direction) is illustrated. In addition, in FIG. 3 and FIG. 4, the rib 23 of FIG. 1 is omitted.

In the following description, X-Y-Z illustrated in the respective drawings are directions orthogonal to one another. Specifically, the Z direction is a vertical direction (that is, a direction in which gravity acts), and the X direction and the Y direction are horizontal directions orthogonal to the vertical direction. For example, the Z direction is referred to as a height direction, a +Z direction is referred to as an upper side (plane), and a −Z direction is referred to as a lower side (bottom surface). In addition, in the illustrated detector 100, terms related to the "X-Y-Z directions" below are convenient expressions for describing a relative positional relationship (or direction) of respective components. In the following description, with reference to a center position of a light shielding space 3 of FIG. 4, a direction away from the light shielding space 3 is referred to as an "outer side", and a direction approaching the light shielding space 3 is referred to as an "inner side". In the following, after describing an overall configuration of the detector 100, details of a particularly characteristic configuration will be described.

The detector 100 illustrated in each of these figures is alarm means that monitors and warns an occurrence of a fire by detecting smoke corresponding to a detection target contained in gas. Specifically, as illustrated in FIG. 4, the detector 100 may be used by being attached to an installation surface 900 corresponding to a surface on a lower side (−Z direction) (that is, a lower surface) of the ceiling in the monitoring area. For example, the detector 100 includes an attachment base 1, an outer cover 2, a light shielding space 3, a smoke detection unit cover 4, an insect screen 5, and a circuit board 6.

(Configuration—Attachment Base)

The attachment base 1 is attachment means for attaching the outer cover 2 to the installation surface 900. A specific type or configuration of the attachment base 1 is arbitrary. For example, the attachment base 1 has an attachment surface 11 corresponding to a surface facing the installation surface 900, is fixed to the installation surface 900 between the outer cover 2 and the installation surface 900 by known fixing means (for example, a screw or a fitting structure), and is made of a disc-shaped resin as a whole.

(Configuration—Outer Cover)

Next, the outer cover 2 of FIG. 4 is a cover that covers the light shielding space 3, the smoke detection unit cover 4, the insect screen 5, and the circuit board 6 (hereinafter an object to be accommodated) corresponding to components of the detector 100. Specifically, the outer cover 2 is attached to the installation surface 900 via the attachment base 1. For example, the outer cover 2 is made of a disc-shaped resin as a whole. Details of the outer cover 2 will be described below.

(Configuration—Light Shielding Space)

Next, the light shielding space 3 of FIG. 4 is a space shielded from light from the outside, is a detection space into which smoke flows, and specifically is a space surrounded by the smoke detection unit cover 4 and the circuit board 6. A specific type or configuration of the light shielding space 3 is arbitrary. For example, the light shielding space 3 is a space including a detection point 31 and an occurrence space 32.

(Configuration—Light Shielding Space—Detection Point)

The detection point 31 is a point in the light shielding space 3, is a point serving as a reference for detecting smoke. For example, the detection point 31 corresponds to a position at which a light emitting side optical axis 611 and a light receiving side optical axis 621 illustrated in FIG. 2 and FIG. 4 and described below intersect each other. As an example, the detection point 31 corresponds to a position near a center of the detector 100 in a horizontal direction (a direction parallel to an XY plane).

(Configuration—Light Shielding Space—Occurrence Space)

The occurrence space 32 is a space in the light shielding space 3, is a space into which smoke flows, and specifically is a space surrounding the detection point 31. For example, the occurrence space 32 is a space irradiated with detection light emitted from a light emitting unit 61 described below and is a space in which scattered light received by a light receiving unit 62 can be generated. Here, the "detection light" is light for detecting smoke to determine an occurrence of a fire, specifically is light corresponding to a basis of scattered light, and is, for example, light emitted and output from the light emitting unit 61. In addition, the "scattered light" is light for detecting smoke to determine an occurrence of a fire, specifically is light generated due to scattering when detection light is scattered by being irradiated to smoke particles, and is, for example, light received by the light receiving unit 62 described below.

(Configuration—Smoke Detection Unit Cover)

Next, the smoke detection unit cover 4 of FIG. 4 is a partition means for partitioning the light shielding space 3. Specifically, the smoke detection unit cover 4 surrounds the light shielding space 3 together with the circuit board 6, and is a formation member that forms the light shielding space 3. A specific type or configuration of the smoke detection unit cover 4 is arbitrary. For example, the smoke detection unit cover 4 is fixed to the circuit board 6 using arbitrary fixing means (for example, a screw, an adhesive, an engaging structure, or a fitting structure), is made of a black resin having a hollow portion, and includes a smoke detection unit cover-side inflow/outflow opening 41.

(Configuration—smoke detection unit cover—smoke detection unit cover-side inflow/outflow opening) The smoke detection unit cover-side inflow/outflow opening 41 is an inflow/outflow opening that allows gas containing smoke to flow into and/or flow out of the light shielding space 3, specifically is an opening provided in the smoke detection unit cover 4, and is, for example, an opening provided toward an opposite side (−Z direction) from the attachment surface 11 in the smoke detection unit cover 4 with reference to a direction (Z direction) substantially orthogonal to the attachment surface 11. Only one smoke detection unit cover-side inflow/outflow opening 41 is provided.

(Configuration—Insect Screen)

Next, the insect screen 5 of FIG. 4 is insect repellent means for preventing insects outside the outer cover 2 from intruding into the light shielding space 3. Specifically, the insect screen 5 prevents insects from entering the light shielding space 3 while allowing gas to flow into the light shielding space 3 from the outside of the outer cover 2 through small holes of the insect screen 5. Details of the insect screen 5 will be described below.

(Configuration—Circuit Board)

Next, the circuit board 6 of FIG. 4 is mounting means on which each element of the detector 100 is mounted, is partition means for partitioning the light shielding space 3, and specifically surrounds the light shielding space 3 together with the smoke detection unit cover 4. A specific type or configuration of the circuit board 6 is arbitrary. For example, the circuit board 6 is fixed to an inside of the cover 2 using the arbitrary fixing means described above, has a flat plate shape extending along the XY plane as a whole, and includes the light emitting unit 61 and the light receiving unit 62.

(Configuration—Circuit Board—Light Emitting Unit)

The light emitting unit 61 is detection means that detects smoke flowing into the light shielding space 3, and specifically is light emitting means that emits detection light toward the occurrence space 32 in the light shielding space 3 along the light emitting side optical axis 611. The light emitting unit 61 is mounted on the circuit board 6, and includes, for example, an arbitrary light emitting component (as an example, a light emitting diode) and an arbitrary optical component (as an example, a prism). Here, the light emitting side optical axis 611 is an axis indicating a straight direction in which detection light from the light emitting unit 61 is output, corresponds to, for example, a straight line connecting a portion of the light emitting unit 61 at which detection light is output and the detection point 31, and corresponds to a straight line virtually illustrated in FIG. 2 and FIG. 4.

(Configuration—Circuit Board—Light Receiving Unit)

The light receiving unit 62 is detection means that detects smoke flowing into the light shielding space 3, and specifically is light receiving means that receives the scattered light generated when detection light emitted from the light emitting unit 61 is scattered by smoke flowing into the occurrence space 32 of the light shielding space 3 along the light receiving side optical axis 621. The light receiving unit 62 is mounted on the circuit board 6, and includes, for example, an arbitrary light receiving component (as an example, a photodiode) and an arbitrary optical component (as an example, a prism). Here, the light receiving side optical axis 621 is an axis indicating a direction in which the light receiving unit 62 receives scattered light. For example, the light receiving side optical axis 621 intersects the light emitting side optical axis 611 at the detection point 31, corresponds to a straight line connecting a portion of the light receiving unit 62 at which scattered light is received and the detection point 31, and corresponds to a straight line virtually illustrated in FIG. 2 and FIG. 4. Further, orientations of the light receiving side optical axis 621 and the light emitting side optical axis 611 may be arbitrarily as long as a point at which these respective axes intersect each other is inside the light shielding space 3. Here, for example, the following description will be made on the assumption that the orientations are set so that a plane defined by the light receiving side optical axis 621 and the light emitting side optical axis 611 is parallel to the XY plane.

(Configuration—Details)

Next, details of the outer cover 2 and the insect screen 5 will be descried.

(Configuration—Details—Outer Cover)

The outer cover 2 of FIG. 4 includes, for example, a main body 21, a guide portion 22, the rib 23 of FIG. 1, and an acceleration area 24.

(Configuration—Details—Outer Cover—Main Body)

The main body 21 is accommodating means that accommodates the object to be accommodated, specifically is formed by a cylindrical portion provided on the upper side (+Z direction) in the height direction (Z direction) and a tapered portion whose diameter decreases from the cylindrical portion toward the lower side (−Z direction), and includes, for example, a main body-side inclination portion 211, an outer cover-side inner side inflow/outflow opening 212, an outer cover-side outer side inflow/outflow opening 213, an a guide wing 214.

(Configuration—Details—Outer Cover—Main Body—Main Body-Side Inclination Portion)

The main body-side inclination portion 211 is guiding means that guides the gas so that the gas flows into the light shielding space 3 through the outer cover-side inner side inflow/outflow opening 212 and the outer cover-side outer side inflow/outflow opening 213, specifically is first guiding means formed on the opposite side (−Z direction) from the attachment surface 11 in the main body 21 with reference to the direction (Z direction) substantially orthogonal to the attachment surface 11, and is first guiding means formed by inclining at least a part of the main body 21 toward the outer cover-side inner side inflow/outflow opening 212 and the outer cover-side outer side inflow/outflow opening 213 as being away from the attachment surface 11, that is, first guiding means formed by inclining at least a part of the main body 21 such that the part is away from the attachment surface 11 as approaching the outer cover-side inner side inflow/outflow opening 212 and the outer cover-side outer side inflow/outflow opening 213 (that is, from the outer side toward the inner side along the XY plane). A specific configuration of the main body-side inclination portion 211 is arbitrary. For example, it is presumed that the main body-side inclination portion 211 is configured by conducting an experiment or simulation to examine an inflow characteristic of gas to determine a position or an inclination angle of the main body-side inclination portion 211 to achieve optimum inflow specification based on a conduction result.

(Configuration—Details—Outer Cover—Main Body—Outer Cover-Side Inner Side Inflow/Outflow Opening)

The outer cover-side inner side inflow/outflow opening 212 is an inflow/outflow opening that allows gas containing smoke to flow into and/or flow out of the light shielding space 3, and is provided toward the opposite side (−Z direction) from the attachment surface 11 in the main body 21 with reference to the direction (Z direction) substantially orthogonal to the attachment surface 11 (which is similarly applied to the outer cover-side outer side inflow/outflow opening 213). A specific configuration of the outer cover-side inner side inflow/outflow opening 212 is arbitrary. For example, at least a part of the outer cover-side inner side inflow/outflow opening 212 is formed by the guide wing 214. In addition, outer cover-side inner side inflow/outflow openings 212 are provided on both sides of a division point 21a. As an example, as illustrated in FIG. 2, eight outer cover-side inner side inflow/outflow openings 212 are provided around the division point 21a. In addition, the outer cover-side inner side inflow/outflow opening 212 is configured such that an opening area narrows as approaching the division point 21a. A statement that "the opening area narrows as approaching the division point 21a" is a concept corresponding to a fact that the outer cover-side inner side inflow/outflow opening 212 narrows toward the division point 21a (which is similarly applied to a similar expression of the outer cover-side outer side inflow/outflow opening 213). Here, the division point 21a is a point that divides gas flowing into the light shielding space 3 and gas flowing out of the light shielding space 3, specifically is a part of the lower side (−Z direction) in the main body 21, and is, for example, a part in which the main body 21 and the guide portion 22 immediately below the detection point 31 are mutually connected to each other.

(Configuration—Details—Outer Cover—Main Body—Outer Cover-Side Outer Side Inflow/Outflow Opening)

A specific configuration of the outer cover-side outer side inflow/outflow opening 213 is arbitrary. For example, at least a part of the outer cover-side outer side inflow/outflow opening 213 is formed by the guide wing 214. In addition, outer cover-side outer side inflow/outflow openings 213 are provided on both sides of the division point 21a. As an example, eight outer cover-side outer side inflow/outflow openings 213 are provided around the eight outer cover-side inner side inflow/outflow openings 212. In addition, the outer cover-side outer side inflow/outflow opening 213 is configured such that an opening area narrows as approaching the division point 21a. In addition, an opening area of each of the outer cover-side outer side inflow/outflow openings 213 is larger than an opening area of each of the outer cover-side inner side inflow/outflow openings 212.

(Configuration—Details—Outer Cover—Main Body—Guide Wing)

The guide wing 214 is guide means that guides gas such that a flow of a plurality of layers of gas is generated at least on the inside of the light shielding space 3 in a flow of gas flowing out of the light shielding space 3 through the outer cover-side inner side inflow/outflow opening 212 and the outer cover-side outer side inflow/outflow opening 213 after flowing into the light shielding space 3 through the outer cover-side inner side inflow/outflow opening 212 and the outer cover-side outer side inflow/outflow opening 213. FIG. 5 is a diagram illustrating an air flow in FIG. 4. A specific configuration of the guide wing 214 is arbitrary. For example, the guide wing 214 performs guiding such that at least a front air flow F1 and a back air flow F2 of FIG. 5 are generated, and is inclined to move to the upper side (+Z direction) as approaching the inner side in the XY plane, that is, inclined toward the detection point 31.

Here, the front air flow F1 and the back air flow F2 are flows of gas generated by at least the guide wing 214, and specifically are two layers of air flows different from each other. Specifically, the front air flow F1 is a flow of gas of a layer flowing into and/or flowing out of the outer cover-side inner side inflow/outflow opening 212, and an air flow of a layer (first layer) flowing at a position relatively close to a surface of the main body 21 on the lower side (−Z direction). The back air flow F2 is a flow of gas of a layer flowing into and/or flowing out of the outer cover-side outer side inflow/outflow opening 213, and an air flow of a layer (second layer) flowing at a position relatively far from the surface of the main body 21 on the lower side (−Z direction), that is, an air flow flowing on the attachment surface 11 side of the front air flow F1.

(Configuration—Details—Outer Cover—Guide Portion)

The guide portion 22 of FIG. 4 is a guide member provided on the opposite side (−Z direction) from the attachment surface 11 via the main body 21 with reference to the direction (Z direction) substantially orthogonal to the attachment surface 11, specifically has a smaller diameter than that of the main body 21 as a whole, and includes, for example, a guide portion-side inclination portion 221.

(Configuration—Details—Outer Cover—Guide Portion—Guide Portion-Side Inclination Portion)

The guide portion-side inclination portion 221 is guiding means that guides gas such that the gas flows into the light shielding space 3 through the outer cover-side inner side inflow/outflow opening 212 and the outer cover-side outer side inflow/outflow opening 213, specifically is second guiding means formed in the guide portion 22, and is second guiding means formed by inclining at least a part of the guide portion 22 on the main body 21 side such that the part approaches the attachment surface 11 toward the outer cover-side inner side inflow/outflow opening 212 and the outer cover-side outer side inflow/outflow opening 213 (that is, from the outer side toward the inner side along the XY plane). A specific configuration of the guide portion-side inclination portion 221 is arbitrary. For example, it is presumed that the guide portion-side inclination portion 221 is configured similarly to the main body-side inclination portion 211.

(Configuration—Details—Outer Cover—Rib)

The rib 23 of FIG. 1 is guiding means that guides gas such that the gas flows into the light shielding space 3 through the outer cover-side inner side inflow/outflow opening 212 and the outer cover-side outer side inflow/outflow opening 213, and specifically functions as reinforcing means that fixes and reinforces the guide portion 22 with respect to the main body 21 while functioning as the guiding means. A specific configuration of the rib 23 is arbitrary. For example, the rib 23 is provided between the main body 21 and the guide portion 22. In addition, eight ribs 23 are radially provided with reference to the division point 21a to mutually partition each of the eight outer cover-side inner side inflow/outflow openings 212 and each of the eight outer cover-side outer side inflow/outflow openings 213 of FIG. 2.

(Configuration—Details—Outer Cover—Acceleration Area)

The acceleration area 24 of FIG. 4 is acceleration means for accelerating gas to cause the gas to flow into the outer cover-side inner side inflow/outflow opening 212 and the outer cover-side outer side inflow/outflow opening 213, specifically is an area provided between the main body 21 and the guide portion 22, and is an area partitioned by the rib 23 of FIG. 1. A specific configuration of the acceleration area 24 is arbitrary. For example, the acceleration area 24 is configured to narrow as approaching the outer cover-side inner side inflow/outflow opening 212 and the outer cover-side outer side inflow/outflow opening 213 (that is, from the outer side to the inner side along the XY plane).

(Configuration—Details—Insect Screen)

The insect screen 5 of FIG. 4 is the insect repellent means. A specific configuration of the insect screen 5 is arbitrary. For example, the insect screen 5 is provided on a side of the outer cover-side inner side inflow/outflow opening 212 and the outer cover-side outer side inflow/outflow opening 213, is provided downstream of the acceleration area 24, is provided on the outside of the light shielding space 3, has a flat plate shape, and is formed separately from the smoke detection unit cover 4. In addition, only one insect screen 5 is provided to cover the outer cover-side inner side inflow/outflow opening 212 and the outer cover-side outer side inflow/outflow opening 213. Here, "downstream of the acceleration area 24" is a concept indicating downstream in gas flowing into the light shielding space 3, and is, for example, a concept indicating that gas flowing into the light shielding space 3 reaches the insect screen 5 after passing through the acceleration area 24.

(Air Flow)

Next, a description will be given of an air flow in the detector 100 configured as described above. In a case in which gas containing smoke generated due to an occurrence of a fire moves in from all directions, the detector 100 can take the gas into the light shielding space 3 and promptly and reliably determine the occurrence of the fire. Here, for example, a description will be given of an example of an air flow in a case in which gas containing smoke due to the fire moves from a left side in the figure toward the detector 100 with reference to FIG. 5.

First, as indicated by white arrows of FIG. 5, gas moving toward the detector 100 is guided to the light shielding space 3 through the outer cover-side inner side inflow/outflow opening 212 and the outer cover-side outer side inflow/outflow opening 213 by at least the main body-side inclination portion 211 and the guide portion-side inclination portion 221. That is, a flow speed of the gas is accelerated in the acceleration area 24, and the gas moves into the light shielding space 3 through the outer cover-side inner side inflow/outflow opening 212, the outer cover-side outer side inflow/outflow opening 213, the insect screen 5, and the smoke detection unit cover-side inflow/outflow opening 41.

In this case, the gas is guided at least by the guide wing 214 so that a plurality of layers of air flow is generated inside the light shielding space 3. That is, the front air flow F1 and the back air flow F2 are generated. With regard to these air flows, the flow speed of the front air flow F1 is higher than the flow speed of the back air flow F2 due to the configuration of the guide wing 214, the opening areas of the outer cover-side inner side inflow/outflow opening 212 and the outer cover-side outer side inflow/outflow opening 213, and the configuration of the outer cover 2 including the acceleration area 24, etc. For this reason, the back air flow F2 is pushed up by the front air flow F1, and at least the pushed up back air flow F2 reliably reaches the occurrence space 32. Thus, it is possible to determine the occurrence of the fire by reliably detecting smoke.

Subsequently, gases of the front air flow F1 and the back air flow F2 are guided to the outside of the light shielding space 3 through the outer cover-side outer side inflow/outflow opening. That is, the gas moves to the outside of the light shielding space 3 through the smoke detection unit cover-side inflow/outflow opening 41, the insect screen 5, the outer cover-side inner side inflow/outflow opening 212, and the outer cover-side outer side inflow/outflow opening 213.

Effect of Embodiment

As described above, according to the present embodiment, it is possible to reliably cause gas containing a detection target to flow into the detection space by including the light shielding space 3, the light emitting unit 61, the light receiving unit 62, and the main body 21.

In addition, for example, an inflow characteristic of gas flowing into the light shielding space 3 through the outer cover-side inner side inflow/outflow opening 212 and the outer cover-side outer side inflow/outflow opening 213 can be improved by guiding gas so that the gas flows into the light shielding space 3 through the outer cover-side inner side inflow/outflow opening 212 and the outer cover-side outer side inflow/outflow opening 213, and thus it is possible to cause gas containing a detection target to reliably flow into the light shielding space 3.

In addition, for example, since gas moving outside the main body 21 can be guided to the light shielding space 3 by including the first guiding means formed by inclining at least a part of the main body 21, it is possible to cause gas to more reliably flow into the light shielding space 3. In addition, for example, since it is unnecessary to prepare a separate component from the main body 21 to guide gas, the cost of the detector 100 can be reduced by reducing the number of components.

In addition, by including the second guiding means formed in the guide portion 22 provided on the opposite side from the attachment surface 11 through the main body 21 with reference to the direction substantially orthogonal to the attachment surface 11, for example, in general, a flow speed of gas moving along the installation surface 900 increases as a distance in a direction orthogonal to the installation surface 900 increases. However, since the gas having the high flow speed can be taken into the light shielding space 3, the gas can be allowed to rapidly flow into the light shielding space 3.

In addition, by providing the outer cover-side inner side inflow/outflow openings 212 and the outer cover-side outer side inflow/outflow openings 213 on both sides of the division point 21a that divides gas flowing into the light shielding space 3 and gas flowing out of the light shielding space 3, for example, inflow and outflow of gas can be smoothly performed. Thus, it is possible to more reliably allow gas containing a detection target to flow into the light shielding space 3.

In addition, since the opening areas of the outer cover-side inner side inflow/outflow opening 212 and the outer cover-side outer side inflow/outflow opening 213 narrow as approaching the division point 21a, for example, a flow speed of gas can be made different between a side far from the division point 21a and a side close to the division point 21a. Thus, inflow and outflow of the gas can be smoothly performed, and the gas containing the detection target can be more reliably introduced into the light shielding space 3.

In addition, by guiding gas so that a flow of a plurality of layers of gas is generated on the inside of the light shielding space 3, for example, gas can be guided using interaction between layers of the flow of the plurality of layers of gas (for example, interaction in which one layer pushes another layer to the back of the light shielding space 3). Thus, the gas containing the detection target can be allowed to reliably flow into the light shielding space 3.

In addition, by guiding gas so that the front air flow F1 corresponding to a flow of gas in the first layer and the back air flow F2 corresponding to a flow of gas in the second layer flowing on the attachment surface 11 side of the first layer are generated, for example, gas can be guided to the entire light shielding space 3 by the first layer and the second layer. Thus, gas containing the detection target can be allowed to reliably flow into the light shielding space 3. In particular, for example, since the flow of gas in the second layer can be pushed into the back of the light shielding space 3 (that is, a position at which gas in the light shielding space 3 is separated from the outer cover-side inner side inflow/outflow opening 212 and the outer cover-side outer side inflow/outflow opening 213) using the flow of gas in the first layer, the gas containing the detection target can be allowed to reliably flow into the light shielding space 3.

In addition, since the guide wing 214 is inclined toward the detection point 31, for example, gas can be guided toward the detection point 31. Therefore, detection sensitivity of the detection target contained in the gas can be improved.

In addition, when the outer cover-side inner side inflow/outflow opening 212 and the outer cover-side outer side inflow/outflow opening 213 are provided toward the opposite side (−Z direction) from the attachment surface 11 in the main body 21 with reference to the direction substantially orthogonal to the attachment surface 11, for example, in general, a flow speed of gas moving along the installation surface 900 increases as a distance in the direction orthogonal to the installation surface 900 increases. However, since gas can be allowed to flow in and/or flow out on the side where the flow speed is high, it is possible to improve the flow characteristic of gas flowing to the light shielding space 3 through the outer cover-side inner side inflow/outflow opening 212 and the outer cover-side outer side inflow/outflow opening 213, and to allow gas containing the detection target to reliably flow into the light shielding space 3.

In addition, since the insect screen 5 is provided downstream of the acceleration area 24, for example, gas can be sufficiently accelerated before the gas reaches the insect screen 5, and thus the gas can be allowed to more reliably flow into the light shielding space 3.

In addition, since the insect screen 5 has the flat plate shape, for example, the insect screen 5 has a relatively simple structure. Thus, it is possible to reduce a manufacturing cost of the insect screen 5 or reduce the number of steps for attaching the insect screen 5 to the detector 100, and it is possible to reduce the cost of the detector 100.

In addition, by providing the outer cover-side inner side inflow/outflow openings 212 and the outer cover-side outer side inflow/outflow openings 213 on both sides of the division point 21*a* that divides gas flowing into the light shielding space 3 and gas flowing out of the light shielding space 3, for example, inflow and outflow of gas can be smoothly performed. Thus, the gas containing the detection target can be allowed to more reliably flow into the light shielding space 3. In addition, since only one insect screen 5 is provided to cover the outer cover-side inner side inflow/outflow openings 212 and the outer cover-side outer side inflow/outflow openings 213 provided on both sides of the division point 21*a*, for example, the insect screen 5 may not be provided for each of the outer cover-side inner side inflow/outflow openings 212 and the outer cover-side outer side inflow/outflow openings 213 (that is, it is unnecessary to provide a plurality of insect screens). Thus, it is possible to reduce the number of components of the detector 100, and to reduce the cost of the detector 100.

Modification to Embodiment

Even though the embodiment according to the invention has been described above, specific configurations and means of the invention can be arbitrarily modified and improved within the scope of the technical idea of each invention described in the claims. Hereinafter, such a modification will be described.

With Regard to Problems to be Solved and Effects of Invention

First, the problems to be solved by the invention and the effects of the invention are not limited to the above contents, and may differ depending on the details of the implementation environment and configuration of the invention. Further, only some of the problems may be solved, or only some of the effects may be achieved.

(With Regard to Dispersion and Integration)

In addition, the above-described configurations are functionally conceptual, and may not be physically configured as illustrated. That is, specific forms of dispersion and integration of each part are not limited to the illustrated ones, and all or some thereof can be configured to be functionally or physically dispersed or integrated in an arbitrary unit. For example, any of the above-described features may be replaced with a conventional one. For example, instead of the light emitting unit 61, it is possible to use a plurality of other light emitting units which has the same function as that of the light emitting unit 61 and outputs detection light of different wavelengths.

(With Regard to Number of Layers of Air Flow)

In the embodiment, a description has been given of a case in which two layers of air flow are generated using the guide wing 214. However, the invention is not limited thereto. For example, by providing two or more other guide wings having the same configuration as that of the guide wing 214 radially between the division point 21*a* and an outer peripheral edge of the main body 21, the number of inflow/outflow openings similar to the outer cover-side inner side inflow/outflow opening 212 and the outer cover-side outer side inflow/outflow opening 213 may be increased to generate three or more layers of air flow. In addition, in any case such as a case in which it is confirmed that the inflow characteristic of gas is excellent, the guide wing 214 may be omitted to generate two layers of air flow.

(With Regard to Insect Screen)

Other insect screens below may be used instead of the insect screen 5 of the embodiment. The other insect screens may be configured to exhibit the same function as that of the insect screen 5, for example, may be provided inside the acceleration area 24, may be provided upstream of the acceleration area 24 in any case such as a case in which it is presumed that a flow of gas is sufficiently fast, may be provided inside the light shielding space 3 (that is, may be configured to cover at least the outer cover-side inner side inflow/outflow opening 212 and the outer cover-side outer side inflow/outflow opening 213 from the inside of the light shielding space 3), may have any shape such as a curved shape other than the flat plate shape, or may be formed integrally with the smoke detection unit cover 4 inside the smoke detection unit cover-side inflow/outflow opening 41 of the smoke detection unit cover 4, or a plurality of insect screens may be provided to cover any of the openings out of the outer cover-side inner side inflow/outflow opening 212 and the outer cover-side outer side inflow/outflow opening 213. In particular, in the case in which the insect screen 5 is configured to cover at least the outer cover-side inner side inflow/outflow opening 212 and the outer cover-side outer side inflow/outflow opening 213 from the inside of the light shielding space 3, for example, the insect screen 5 can be hidden from the outside of the detector 100. Thus, it is possible to simplify an appearance of the detector 100, and to improve design of the detector 100. In addition, in the case in which the insect screen 5 is formed integrally with the smoke detection unit cover 4, for example, in the case of manufacturing the detector 100, it is possible to omit an attachment operation of attaching the insect screen 5 to the smoke detection unit cover 4. Thus, it is possible to reduce the cost of the detector 100.

(With Regard to Detection Point)

All points in the occurrence space 32 of the embodiment may be interpreted as detection points.

One embodiment of the present invention provides a detector comprises: a detection space into which a detection target flows; detection means that detects the detection target flowing into the detection space; and accommodating means that accommodates the detection means and the detection space.

According to this embodiment, it is possible to reliably cause gas containing a detection target to flow into the detection space by including the detection space, the detection means, and the accommodating means.

Another embodiment of the present invention provides the alarm apparatus according to the above embodiment, wherein the detector is the detector attached to an installation surface of an installation object and is the detector having an attachment surface facing the installation surface, the detector further comprises: an inflow/outflow opening that allows gas containing the detection target to flow into and flow out of the detection space, the inflow/outflow opening being provided toward an opposite side from the attachment surface in the accommodating means with reference to a direction substantially orthogonal to the attachment surface; and guiding means that guides the gas so that the gas flows into the detection space through the inflow/outflow opening.

According to this embodiment, for example, an inflow characteristic of gas flowing into the detection space through the inflow/outflow opening can be improved by guiding gas so that the gas flows into the detection space through the inflow/outflow opening, and thus it is possible to cause gas containing a detection target to reliably flow into the detection space.

Another embodiment of the present invention provides the alarm apparatus according to the above embodiment, wherein the inflow/outflow opening is provided on both sides of a division point that divides the gas flowing into the detection space and the gas flowing out of the detection space.

According to this embodiment, by providing the inflow/outflow opening on both sides of the division point that divides gas flowing into the detection space and gas flowing out of the detection space, for example, inflow and outflow of gas can be smoothly performed. Thus, it is possible to more reliably allow gas containing a detection target to flow into the detection space.

Another embodiment of the present invention provides the alarm apparatus according to the above embodiment, wherein the inflow/outflow opening has an opening area that narrows as approaching the division point.

According to this embodiment, since the opening areas of the inflow/outflow opening narrow as approaching the division point, for example, a flow speed of gas can be made different between a side far from the division point and a side close to the division point. Thus, inflow and outflow of the gas can be smoothly performed, and the gas containing the detection target can be more reliably introduced into the detection space.

Another embodiment of the present invention provides the alarm apparatus according to the above embodiment, further comprises: an inflow/outflow opening that allows gas containing the detection target to flow into and flow out of the detection space; and guiding means that guides the gas so that a flow of a plurality of layers of the gas is generated at least inside the detection space in a flow of the gas flowing out of the detection space through the inflow/outflow opening after flowing into the detection space through the inflow/outflow opening.

According to this embodiment, by guiding gas so that a flow of a plurality of layers of gas is generated on the inside of the detection space, for example, gas can be guided using interaction between layers of the flow of the plurality of layers of gas (for example, interaction in which one layer pushes another layer to the back of the detection space). Thus, the gas containing the detection target can be allowed to reliably flow into the detection space.

Another embodiment of the present invention provides the alarm apparatus according to the above embodiment, wherein the detector is attached to an installation surface of an installation object, the detector has an attachment surface facing the installation surface, the inflow/outflow opening is provided toward an opposite side from the attachment surface in the accommodating means with reference to a direction substantially orthogonal to the attachment surface, and the guiding means guides the gas so that at least a flow of the gas in a first layer and a flow of the gas in a second layer flowing on an attachment surface side of the first layer are generated.

According to this embodiment, by guiding gas so that the air flow in the first layer and the air flow in the second layer flowing on the attachment surface side of the first layer are generated, for example, gas can be guided to the entire detection space by the first layer and the second layer. Thus, gas containing the detection target can be allowed to reliably flow into the detection space. In particular, for example, since the flow of gas in the second layer can be pushed into the back of the detection space (that is, a position at which gas in the detection space is separated from the inflow/outflow opening) using the flow of gas in the first layer, the gas containing the detection target can be allowed to reliably flow into the detection space.

Another embodiment of the present invention provides the alarm apparatus according to the above embodiment, wherein the guide means is inclined toward a detection point in the detection space, the detection target being detected by the detection means at the detection point.

According to this embodiment, since the guide means is inclined toward the detection point, for example, gas can be guided toward the detection point. Therefore, detection sensitivity of the detection target contained in the gas can be improved.

Another embodiment of the present invention provides the alarm apparatus according to the above embodiment, wherein the detector is the detector attached to an installation surface of an installation object and is the detector having an attachment surface facing the installation surface, the detector further comprises: an inflow/outflow opening that allows gas containing the detection target to flow into and/or flow out of the detection space, the inflow/outflow opening being provided toward an opposite side from the attachment surface in the accommodating means with reference to a direction substantially orthogonal to the attachment surface; and an insect screen provided on a side of the inflow/outflow opening.

According to this embodiment, when the inflow/outflow opening are provided toward the opposite side from the attachment surface in the accommodating means with reference to the direction substantially orthogonal to the attachment surface, for example, in general, a flow speed of gas moving along the installation surface increases as a distance in the direction orthogonal to the installation surface increases. However, since gas can be allowed to flow in and/or flow out on the side where the flow speed is high, it is possible to improve the flow characteristic of gas flowing to the detection space through the inflow/outflow opening, and to allow gas containing the detection target to reliably flow into the detection space.

Another embodiment of the present invention provides the alarm apparatus according to the above embodiment, wherein the insect screen is provided downstream of an acceleration area formed between the accommodating means and a guide member provided on the opposite side from the attachment surface with the accommodating means interposed therebetween with reference to the direction substantially orthogonal to the attachment surface, the acceleration area accelerating the gas so that the gas flows into the inflow/outflow opening.

According to this embodiment, since the insect screen is provided downstream of the acceleration area, for example, gas can be sufficiently accelerated before the gas reaches the insect screen, and thus the gas can be allowed to more reliably flow into the detection space.

Another embodiment of the present invention provides the alarm apparatus according to the above embodiment, wherein the insect screen covers at least the inflow/outflow opening from an inside of the detection space.

According to this embodiment, since the insect screen is configured to cover at least the inflow/outflow opening from the inside of the detection space, for example, the insect screen can be hidden from the outside of the detector. Thus, it is possible to simplify an appearance of the detector, and to improve design of the detector.

Another embodiment of the present invention provides the alarm apparatus according to the above embodiment, wherein the insect screen has a flat plate shape.

According to this embodiment, since the insect screen has the flat plate shape, for example, the insect screen has a relatively simple structure. Thus, it is possible to reduce a manufacturing cost of the insect screen or reduce the number of steps for attaching the insect screen to the detector, and it is possible to reduce the cost of the detector.

Another embodiment of the present invention provides the alarm apparatus according to the above embodiment, wherein the insect screen is formed integrally with a formation member that forms the detection space.

According to this embodiment, since the insect screen is formed integrally with the formation member, for example, in the case of manufacturing the detector, it is possible to omit an attachment operation of attaching the insect screen to the formation member. Thus, it is possible to reduce the cost of the detector.

Another embodiment of the present invention provides the alarm apparatus according to the above embodiment, wherein the inflow/outflow opening is provided on both sides of a division point that divides the gas flowing into the detection space and the gas flowing out of the detection space, and one insect screen is provided to cover the inflow/outflow opening provided on the both sides of the division point.

According to this embodiment, by providing the inflow/outflow opening on both sides of the division point that divides gas flowing into the detection space and gas flowing out of the detection space, for example, inflow and outflow of gas can be smoothly performed. Thus, the gas containing the detection target can be allowed to more reliably flow into the detection space. In addition, since only one insect screen is provided to cover the inflow/outflow opening provided on both sides of the division point, for example, the insect screen may not be provided for each of the inflow/outflow opening (that is, it is unnecessary to provide a plurality of insect screens). Thus, it is possible to reduce the number of components of the detector, and to reduce the cost of the detector.

Another embodiment of the present invention provides the alarm apparatus according to the above embodiment, wherein the detection target is smoke or carbon monoxide.

According to this embodiment, when the detection target is smoke or carbon monoxide, for example, in general, a flow speed of gas containing smoke or carbon monoxide moving along the installation surface increases as a distance in the direction orthogonal to the installation surface increases. However, since gas containing smoke or carbon monoxide can be allowed to flow in and/or flow out on the side where the flow speed is high, it is possible to improve the flow characteristic of gas containing smoke or carbon monoxide flowing to the detection space through the inflow/outflow opening, and to allow gas containing smoke or carbon monoxide to reliably flow into the detection space.

REFERENCE SIGNS LIST

1 Attachment base
2 Outer cover
3 Light shielding space
4 Smoke detection unit cover
5 Insect screen
6 Circuit board
11 Attachment surface
21 Main body
21a Division point
22 Guide portion
23 Rib
24 Acceleration area
31 Detection point
32 Occurrence space
41 Smoke detection unit cover-side inflow/outflow opening
61 Light emitting unit
62 Light receiving unit
100 Detector
211 Main body-side inclination portion
212 Outer cover-side inner side inflow/outflow opening
213 Outer cover-side outer side inflow/outflow opening
214 Guide wing
221 Guide portion-side inclination portion
611 Light emitting side optical axis
621 Light receiving side optical axis
900 Installation surface
F1 Front air flow
F2 Back air flow

The invention claimed is:

1. A detector which is attached to an installation surface of an installation object, comprising: an attachment surface facing the installation surface,
   a detection space into which a detection target flows;
   detection means that detects the detection target flowing into the detection space;
   accommodating means that accommodates the detection means and the detection space,
   an inflow/outflow opening that allows gas containing the detection target to flow into and flow out of the detection space, the inflow/outflow opening being provided toward an opposite side from the attachment surface in the accommodating means with reference to a direction orthogonal to the attachment surface; and
   guiding means that guides the gas so that the gas flows into the detection space through the inflow/outflow opening, wherein
   the guiding means is connected to a surface on the opposite side of the attachment surface in the accommodating means,
   a connection point where the accommodating means and the guiding means are connected to each other is configured as a division point that divides gas flowing into the detection space and gas flowing out of the detection space, and
   the inflow/outflow opening is provided close to the division point.

2. The detector according to claim 1, wherein the inflow/outflow opening is provided on both sides of the division point.

3. The detector according to claim 2, wherein the inflow/outflow opening has an opening area that narrows as approaching the division point.

4. The detector according to claim 1, further comprising:
a guiding wing that guides the gas so that a flow of a plurality of layers of the gas is generated at least inside the detection space in a flow of the gas flowing out of the detection space through the inflow/outflow opening after flowing into the detection space through the inflow/outflow opening.

5. The detector according to claim 4,
wherein
the guiding wing guides the gas so that at least a flow of the gas in a first layer and a flow of the gas in a second layer flowing on an attachment surface side of the first layer are generated.

6. The detector according to claim 4, wherein the guide wing is inclined toward a detection point in the detection space, the detection target being detected by the detection means at the detection point.

7. The detector according to claim 1,
further comprising:
an insect screen provided on a side of the inflow/outflow opening.

8. The detector according to claim 7, wherein the insect screen is provided downstream of an acceleration area formed between the accommodating means and a guide member provided on the opposite side from the attachment surface with the accommodating means interposed therebetween with reference to the direction orthogonal to the attachment surface, the acceleration area accelerating the gas so that the gas flows into the inflow/outflow opening.

9. The detector according to claim 7, wherein the insect screen covers at least the inflow/outflow opening from an inside of the detection space.

10. The detector according to claim 7, wherein the insect screen has a flat plate shape.

11. The detector according to claim 7, wherein the insect screen is formed integrally with a formation member that forms the detection space.

12. The detector according to claim 7,
wherein the inflow/outflow opening is provided on both sides of the division point, and
one insect screen is provided to cover the inflow/outflow opening provided on the both sides of the division point.

13. The detector according to claim 7, wherein the detection target is smoke or carbon monoxide.

* * * * *